United States Patent
Sumida et al.

(10) Patent No.: US 7,554,729 B2
(45) Date of Patent: Jun. 30, 2009

(54) REAR PROJECTION DISPLAY APPARATUS AND TRANSMISSION TYPE SCREEN

(75) Inventors: Takao Sumida, Kanagawa (JP); Takaaki Iwaki, Tokyo (JP)

(73) Assignee: Sony Corporation, Tokyo (JP)

( * ) Notice: Subject to any disclaimer, the term of this patent is extended or adjusted under 35 U.S.C. 154(b) by 14 days.

(21) Appl. No.: 11/706,960

(22) Filed: Feb. 16, 2007

(65) Prior Publication Data

US 2007/0206161 A1 Sep. 6, 2007

(30) Foreign Application Priority Data

Mar. 1, 2006 (JP) .............................. 2006-055010

(51) Int. Cl.
*G03B 21/56* (2006.01)
(52) U.S. Cl. ...................... 359/443; 359/460
(58) Field of Classification Search ................. 359/443, 359/460
See application file for complete search history.

(56) References Cited

U.S. PATENT DOCUMENTS

| 4,984,871 | A  | * | 1/1991 | Martinez ..................... 359/443 |
| 6,348,993 | B1 | * | 2/2002 | Hori ............................ 359/443 |
| 7,245,427 | B2 | * | 7/2007 | Sekiguchi et al. ........... 359/443 |

2005/0185270 A1 8/2005 Engle

FOREIGN PATENT DOCUMENTS

| JP | 7-92565 | 4/1995 |
| JP | 07-092565 A | 4/1995 |
| JP | 2000-180970 A | 6/2000 |
| JP | 2000-187280 A | 7/2000 |

OTHER PUBLICATIONS

European Search Report mailed by European Patent Office for EP 07 25 0766.8 dated Feb. 12, 2009.

\* cited by examiner

*Primary Examiner*—Christopher Mahoney
(74) *Attorney, Agent, or Firm*—Finnegan, Henderson, Farabow, Garrett & Dunner, L.L.P.

(57) ABSTRACT

A rear projection display apparatus is provided which includes a transmission type screen installed on the front face of an apparatus main body, and a video projector disposed inside the apparatus main body and projecting video on the transmission type screen from the rear side thereof. The transmission type screen includes a lens sheet having respective ribs attached to upper and lower sides thereof, the ribs having increased thickness, and an upper bracket and a lower bracket attached to the lens sheet so as to retainably embrace the respective associated ribs. The upper bracket is fixed to a frame on an apparatus main body side, whereby the lens sheet is installed so as to be pulled downward by the weight of the lower bracket. The rib is formed by laminating the same materials as a substrate of the lens sheet.

8 Claims, 6 Drawing Sheets

REAR PROJECTION DISPLAY APPARATUS AND TRANSMISSION TYPE SCREEN

CROSS REFERENCES TO RELATED APPLICATIONS

The present invention contains subject matter related to Japanese Patent Application JP 2006-055010 filed in the Japan Patent Office on Mar. 1, 2006, the entire contents of which being incorporated herein by reference.

BACKGROUND OF THE INVENTION

1. Field of the Invention

The present invention relates to a rear projection display apparatus which projects and displays video on a transmission type screen from the rear side thereof and a transmission type screen used in the rear projection display apparatus.

2. Description of the Related Art

In general, a rear projection display apparatus is configured to project and display video on a transmission type screen installed on the front face of the apparatus main body from a video projector installed on the rear side of the transmission type screen. The transmission type screen used in the rear projection display apparatus uses a lens sheet such as a lenticular lens sheet or a Fresnel lens sheet in order to obtain desired image display performance.

Such a lens sheet needs a measure to maintain a predetermined planar shape since the lens sheet itself has low rigidity. In the past, the planar shape has been maintained by bonding the lens sheet to a resin molding plate or glass plate which is a rigid body.

However, because of using the resin molding or glass plate, this configuration increases the weight of the entire screen, which produces the following disadvantages: A frame retaining the screen may need increased rigidity, which tends to increase the cost of material and which increases the thickness of the frame to thereby impose restrictions on the design of the screen.

To eliminate such disadvantages, a screen configured as disclosed in e.g. Japanese Patent Laid-open No. Hei 7-92565 (Patent Document 1) has been proposed as a transmission type screen that can maintain the planar shape of a lens sheet without use of a resin molding plate or glass plate. More specifically, the screen described in Patent Document 1 includes ribs fixedly attached to at least one side of a lens sheet, brackets fixedly attached to frames disposed on the circumferential edge of the lens sheet, and an elastic body having a restoring force acting between the rib and the bracket so as to be separate from each other, and in that the lens sheet is stretched and supported by the action of the elastic body.

SUMMARY OF THE INVENTION

However, the screen described in Patent Document 1 maintains the planar shape of the lens sheet by using the force of the elastic body. If the force of the elastic body lowers due to the secular change or the like, therefore, it becomes difficult for the lens sheet to maintain the planar shape, causing deformation or strain. In Patent Document 1, the lens sheet and the rib are made of different materials. That is, they are different from each other in solid state property (expansion coefficient and water absorption coefficient) based on the environmental changes such as temperature and humidity. Therefore, the lens sheet tends to produce deformation or strain, which consequently poses a problem of remarkably deteriorating the image display performance of the screen.

Thus, it is desirable to provide a transmission type screen that can reliably suppress the occurrence of deformation or strain in a lens sheet, thereby maintaining excellent image display performance.

According to an embodiment of the present invention, there is provided a rear projection display apparatus including: a transmission type screen installed on the front face of an apparatus main body; and a video projector disposed inside the apparatus main body and projecting video on the transmission type screen from the rear side thereof; wherein the transmission type screen includes a lens sheet having respective ribs attached to upper and lower sides thereof, the ribs having increased thickness, and an upper bracket and a lower bracket attached to the lens sheet so as to retainably embrace the respective associated ribs; and the upper bracket is fixed to a frame on an apparatus main body side, whereby the lens sheet is installed so as to be pulled downward by the weight of the lower bracket.

In this configuration, the rib is formed by laminating the same materials as a substrate of the lens sheet.

In this configuration, preferably, the transmission type screen includes a lens plate juxtaposed to the lens sheet and the lens plate is retained between the upper bracket and the lower bracket, and the weight of the lens plate together with the weight of the lower bracket is applied to the lens sheet.

Further in this configuration, preferably, the transmission type screen includes an elastic body which is disposed between the lower bracket and the frame on the apparatus main body side so as to prevent the upward movement of the lens sheet.

The present invention can provide a rear projection display apparatus including a structurally stable, thin transmission type screen which does not cause the deformation or strain of a lens sheet resulting from the environment changes or vibration during transportation, thereby maintaining excellent image display performance.

DETAILED DESCRIPTION OF THE PREFERRED EMBODIMENTS

A preferred embodiment of the present invention will hereinafter be described in detail with reference to the drawings.

Figure 1:
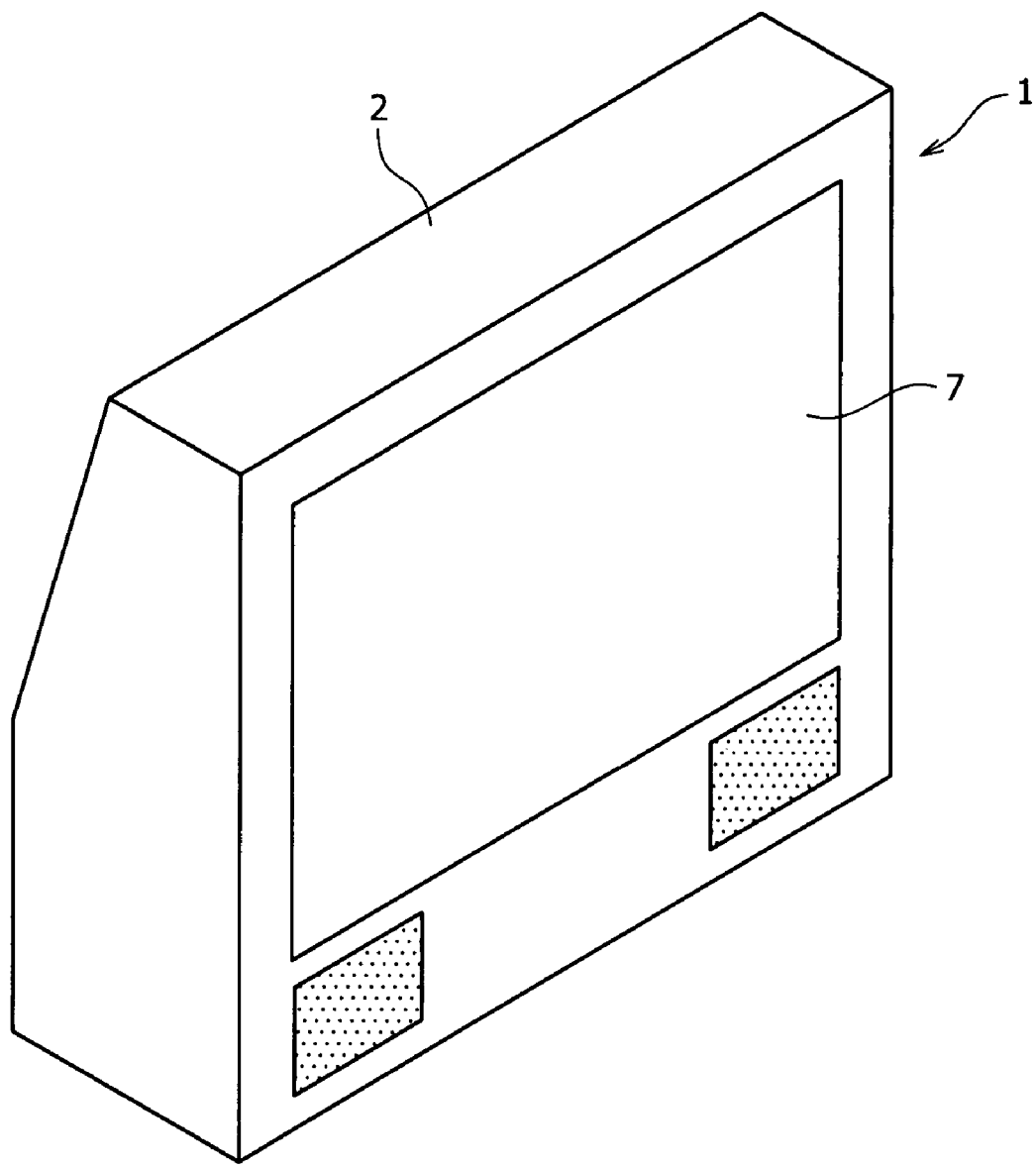
FIG. 1 is a perspective view illustrating the external appearance of a rear projection display apparatus embodying the present invention.
Figure 2:
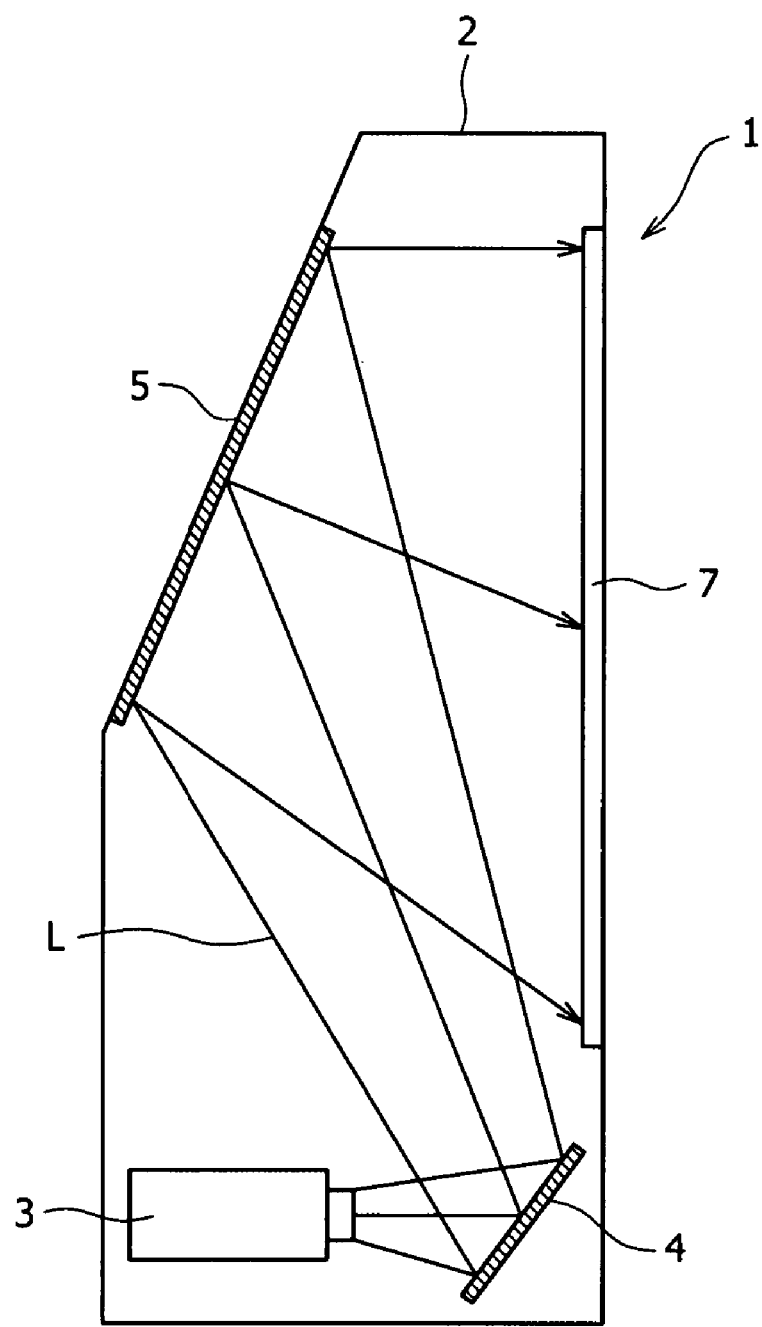
FIG. 2 is a side view illustrating the inner configuration of the rear projection display apparatus embodying the present invention.

FIG. 1 is a perspective view illustrating the external appearance of a rear projection display apparatus according to the embodiment of the invention. FIG. 2 is a side view illustrating the internal configuration of the apparatus.

As shown in FIG. 1, the rear projection display apparatus 1 includes a transmission type screen 7 on the front face of an apparatus main body 2 and projects and displays video on the transmission type screen 7 from the rear side thereof. More specifically, as shown in FIG. 2, a video projector 3 is installed inside the apparatus main body 2. Video light L emitted from the video projector 3 is reflected by reflection mirrors 4, 5 and then projected on the transmission type screen 7.

The embodiment of the present invention relates to the structure of the transmission type screen 7 used in such a rear projection display apparatus.

Figure 3:
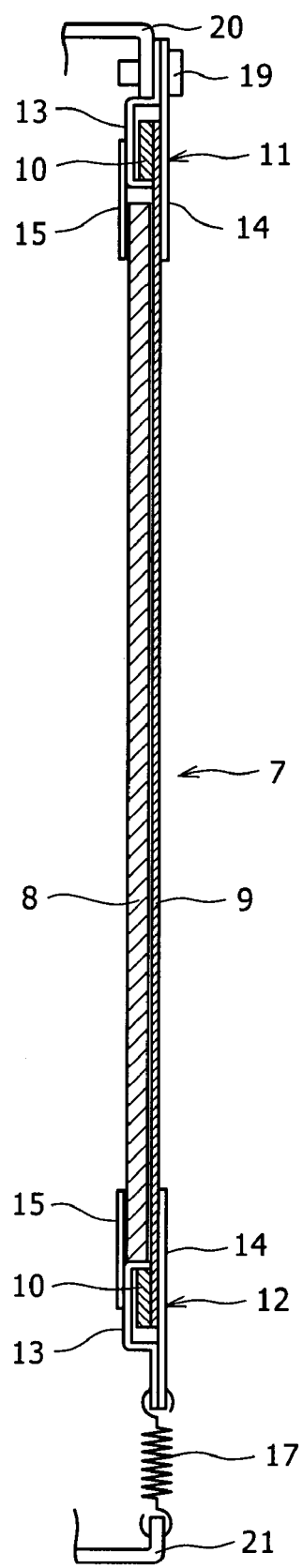
FIG. 3 is a side view illustrating the configuration of a transmission type screen according to an embodiment of the present invention.
Figure 4:
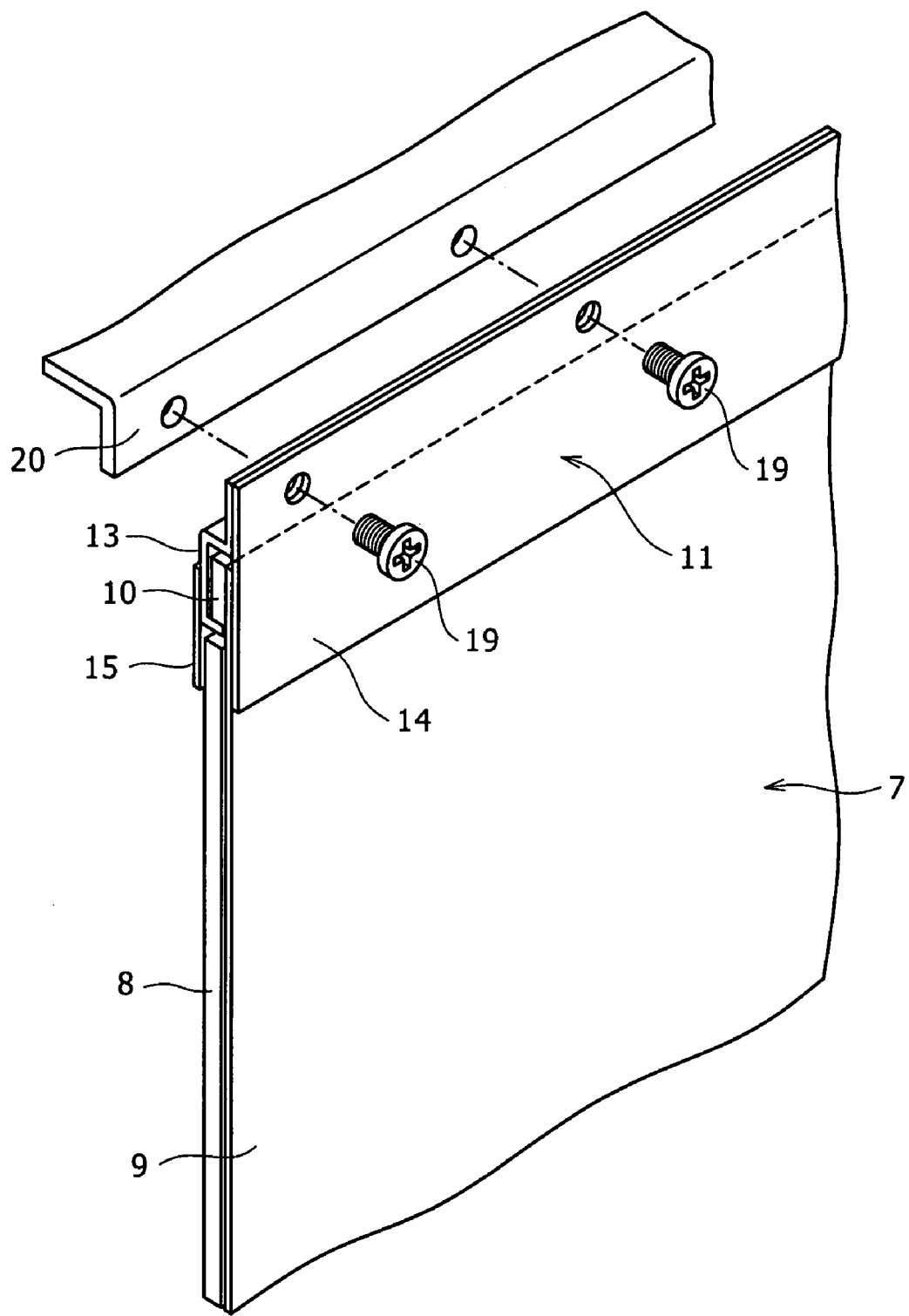
FIG. 4 is a partial perspective view of the transmission type screen according to an embodiment of the present invention.

The structure of the transmission type screen 7 according to the embodiment of the invention is illustrated in FIGS. 3 and 4. The transmission type screen 7 is configured such that a Fresnel lens plate 8 adapted to focus light and a lenticular lens sheet 9 adapted to uniformly distribute light to the entire screen are juxtaposed to each other. The Fresnel lens plate 8 includes a resin molding plate or glass plate as a substrate and a Fresnel lens sheet bonded to the substrate. On the other hand, the lenticular lens sheet 9 is installed in a state of a sheet, that is, without use of a substrate unlike the Fresnel lens plate. This achieves the thinning of the screen 7.

In this configuration, the lenticular lens sheet 9 needs to maintain a stable planar shape in order to ensure the excellent image display performance of the transmission type screen 7. To meet the need, the transmission type screen 7 of the embodiment adopts the following configuration.

The lenticular lens sheet 9 of the transmission type screen 7 includes ribs 10 (thick portions) with increased thickness disposed at the upper and lower side portions thereof. An upper bracket 11 and a lower bracket 12 are attached to retainably embrace the respective ribs 10.

Each of the upper bracket 11 and the lower bracket 12 integrally includes a hooked retaining-plate 13 and a front plate 14 fixed on the front side of the retaining-plate 13. The rib 10 of the lenticular lens sheet 9 is retainably embraced between the retaining plate 13 and the front plate 14.

In this configuration, the lenticular lens sheet 9 includes a resin sheet as a substrate and the ribs bonded to the upper and lower side portions of the substrate. In addition, the resin sheet measures 1600 mm in horizontal width, 900 mm in longitudinal width (length) and 0.3 mm in thickness and each of the ribs measures 1600 mm in horizontal width, 15 mm in longitudinal width (length) and 3 mm in thickness. On the other hand, the upper and lower brackets 11 and 12 use a metallic material, e.g. iron, having the predetermined rigidity and weight and are each formed to have almost the same horizontal width as that of the lenticular lens sheet 9.

Figure 5:
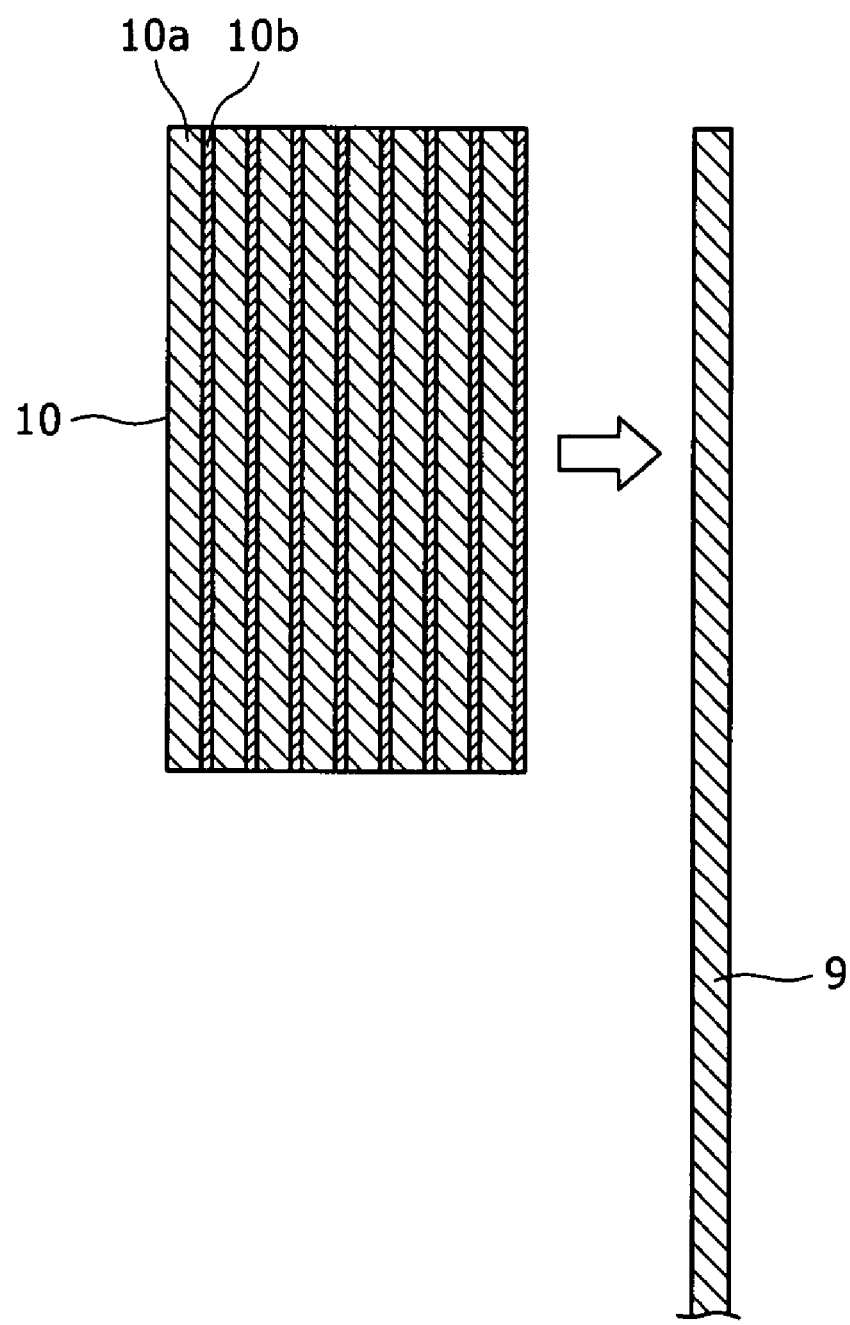
FIG. 5 is a diagram for assistance in explaining the structure of a rib.

The substrate of the lenticular lens sheet 9 preferably uses a resin material such as PET, PC, PP, PS, or ABS as a material less susceptible deformation or strain due to environmental changes (temperatures: −20° C. to 60° C., humidity: to 95% RH). As shown in FIG. 5, each rib 10 is formed by laminating a plurality of sheet materials 10a (eight in the embodiment) having the same thickness as the substrate of the lenticular lens sheet 9 and applying an adhesive 10b between the sheet materials 10a for adhesion. The sheet material 10a is the same as the substrate of the lenticular lens sheet 9 and has a thickness of 3 mm. The rib 10 thus formed is bonded to the lenticular lens sheet 9.

The transmission type screen 7 configured as described above is installed with the lenticular lens sheet 9 pulled downward by the force of gravity by fixing the upper bracket 11 to the upper frame 20 on the apparatus main body side with screws 19. In this case, the weight of the lower bracket 12 and the lenticular lens sheet 9 is applied as a load to the lower face side of the rib 10 located on the upper side of the lenticular lens sheet 9 and to the upper face side of the rib 10 located on the lower side of the lenticular lens sheet 9. This brings the lenticular lens sheet 9 into a state where it is strongly pulled downwardly, which eliminates deformation and strain from the lenticular lens sheet 9.

In this configuration, a back plate 15 is integrally fixed to the retaining-plate 13 of each of the upper bracket 11 and the lower bracket 12. This back plate 15 is used to retain the Fresnel lens plate 8 juxtaposed to the lenticular lens sheet 9. The Fresnel lens plate 8 is retained between the upper bracket 11 and the lower bracket 12, so that its weight together with that of the lower bracket 12 is applied to the lenticular lens sheet 9. Specifically, the weight of the lower bracket 12 is about 2 kg and the weight of the Fresnel lens plate 8 is about 2 kg. That is to say, the load of about 4 kg in total is additionally applied to the lenticular lens sheet as a downward pulling force.

Further in this configuration, a coil spring 17 as an elastic body is attached between the lower bracket 12 and the lower frame 21 on the apparatus main body side in order to prevent the upward movement of the lenticular lens sheet 9. More specifically, the lower bracket 12 has a movable margin in its own weight direction. In addition, the lower bracket 12 is connected to the lower frame 21 via the coil spring 17 with elasticity so that the lenticular lens sheet 9 is prevented from moving upward, namely, in the direction opposite to the lower bracket's own weight direction. Thus, the lenticular lens sheet 9 is not affected by environmental changes or vibration during transportation.

As described above, the transmission type screen is configured such that the lenticular lens sheet 9 is installed so as to be pulled downward by the weight of the lower bracket 12. Thus, the lenticular lens sheet 9 can maintain a stable-planar shape without the occurrence of deformation or strain.

In particular, in the transmission type screen 7, the ribs 10 attached to the upper and lower side portions of the lenticular lens sheet 9 are formed by laminating the same sheet materials 10a as the substrate of the lenticular lens sheet 9. Therefore, the lenticular lens sheet 9 and the rib 10 have the same solid state properties (expansion coefficient and water absorption coefficient) based on the environmental changes such as temperature and humidity. This can bring the lenticular lens sheet 9 into a structure less susceptible to deformation or strain.

The transmission type screen 7 is configured such that the weight of the Fresnel lens plate 8 juxtaposed to the lenticular lens sheet together with the weight of the lower bracket 12 is applied to the lenticular lens sheet 9. Therefore, the force that pulls the lenticular lens sheet 9 downwardly can be further increased, which can further reliably prevent the deformation or strain of the lenticular lens sheet.

Further, the transmission type screen 7 is provided between the lower bracket 12 and the lower frame 21 on the apparatus main body side with the coil spring 17 which prevents the upward movement of the lenticular lens sheet 9. Thus, the lenticular lens sheet 9 can maintain the stable planar shape without the occurrence of deformation or strain even if the environment changes or vibration occurs during transportation.

As described above, the present embodiment can provide the rear projection display apparatus 1 including the structurally stable, thin transmission type screen 7 which does not cause the deformation or strain of the lenticular lens sheet 9 resulting from the environment changes or vibration during transportation, thereby maintaining excellent image display performance.

Figure 6:
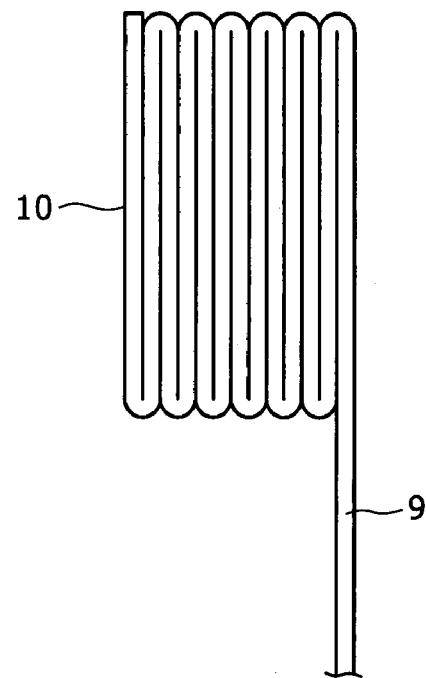
FIG. 6 is a diagram for assistance in explaining another structure of the rib.
Figure 7:
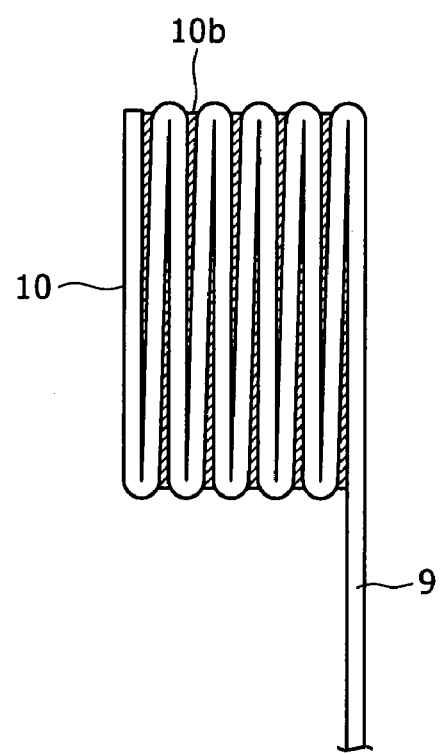
FIG. 7 is a diagram for assistance in explaining still another structure of the rib.

While the embodiment of the present invention has been described thus far, the invention is not limited by the constitution of the embodiment. In the embodiment, for example, the rib is formed by laminating a large number of the same sheet materials 10a as the substrate of the lenticular lens sheet 9. Alternatively, as shown in FIG. 6, a rib 10 may be formed by folding the end of a lenticular lens sheet 9 several times. In addition to this constitution, as shown in FIG. 7, the folded portions are bonded together by applying an adhesive 10b therebetween.

The present invention can modify or alter the other portions in various ways without being restricted by the embodiment described above.

What is claimed is:

1. A rear projection display apparatus comprising:
    an apparatus main body;
    a transmission type screen on the front face of the apparatus main body; and
    a video projector inside the apparatus main body and projecting video on the transmission type screen from the rear side thereof;
    wherein the transmission type screen includes:
        a lens sheet having upper and lower sides, a rib attached to the upper side, and a rib attached to the lower side, the ribs having increased thickness, and the ribs comprising laminated sheets, and
        an upper bracket and a lower bracket attached to the lens sheet so as to retainably embrace the ribs,
        wherein the upper bracket is fixed to a frame on a side of the apparatus main body, whereby the lens sheet is installed so as to be pulled downward by the weight of the lower bracket.

2. The rear projection display apparatus according to claim 1, wherein the ribs are formed by laminating the same materials as a substrate of the lens sheet.

3. The rear projection display apparatus according to claim 1, wherein the transmission type screen includes a lens plate juxtaposed to the lens sheet, the lens plate is retained between the upper bracket and the lower bracket, and the weight of the lens plate together with the weight of the lower bracket is applied to the lens sheet.

4. The rear projection display apparatus according to claim 1, wherein the transmission type screen includes an elastic body which is disposed between the lower bracket and the frame on the apparatus main body side so as to prevent the upward movement of the lens sheet.

5. A transmission type screen for the front face of a rear projection display apparatus main body, comprising:
    a lens sheet having upper and lower sides, a rib attached to the upper side, and a rib attached to the lower side, the ribs having increased thickness, and the ribs comprising laminated sheets; and
    an upper bracket and a lower bracket attached to the lens sheet so as to retainably embrace the ribs;
    wherein the upper bracket is configured to be fixed to a frame on a side of the rear projection display apparatus main body, whereby the lens sheet is configured to be installed so as to be pulled downward by the weight of the lower bracket.

6. The transmission type screen according to claim 5, wherein the ribs are formed by laminating the same materials as a substrate of the lens sheet.

7. The transmission type screen according to claim 5, further comprising:
    a lens plate juxtaposed to the lens sheet,
    wherein the lens plate is retained between the upper bracket and the lower bracket, and the weight of the lens plate together with the weight of the lower bracket is applied to the lens sheet.

8. The transmission type screen according to claim 5, further comprising:
    an elastic body which is disposed between the lower bracket and the frame on the apparatus main body side so as to prevent the upward movement of the lens sheet.

* * * * *